(12) United States Patent
Hughey

(10) Patent No.: US 7,997,234 B1
(45) Date of Patent: Aug. 16, 2011

(54) COMBINED CLIMATE-CONTROLLED KENNEL SUPPORTING ENCLOSURE AND CARRYING KENNEL AND ASSOCIATED METHOD

(76) Inventor: Wanda Hughey, Washington, DC (US)

( * ) Notice: Subject to any disclaimer, the term of this patent is extended or adjusted under 35 U.S.C. 154(b) by 123 days.

(21) Appl. No.: 12/378,359

(22) Filed: Feb. 13, 2009

Related U.S. Application Data

(60) Provisional application No. 61/065,639, filed on Feb. 14, 2008.

(51) Int. Cl.
*A01K 1/03* (2006.01)
(52) U.S. Cl. ......................... 119/496; 119/500
(58) Field of Classification Search .................. 119/482, 119/496, 497, 499–501, 452, 453, 462, 463
See application file for complete search history.

(56) References Cited

U.S. PATENT DOCUMENTS

| | | | | |
|---|---|---|---|---|
| 3,175,534 A * | 3/1965 | Pollard | .......................... | 119/174 |
| 4,171,683 A * | 10/1979 | Godin | ........................... | 119/482 |
| 4,526,133 A * | 7/1985 | LoMaglio | ..................... | 119/419 |
| 4,827,872 A * | 5/1989 | Sommers | ...................... | 119/492 |
| 5,003,923 A * | 4/1991 | Morgan | ......................... | 119/482 |
| 5,070,931 A * | 12/1991 | Kalthoff et al. | .............. | 165/11.1 |
| 5,154,137 A * | 10/1992 | Stanaland | ..................... | 119/496 |
| 5,799,614 A * | 9/1998 | Greenwood | ................... | 119/452 |
| 5,988,110 A * | 11/1999 | Peterson | ....................... | 119/453 |
| 6,234,116 B1 * | 5/2001 | Havener | ......................... | 119/482 |
| 6,357,394 B1 * | 3/2002 | Waters et al. | .................. | 119/472 |
| 6,517,428 B1 * | 2/2003 | Murray et al. | ................... | 454/56 |
| 6,870,136 B1 * | 3/2005 | Majordy | ........................ | 219/400 |
| 7,322,314 B1 * | 1/2008 | Sweeney | ........................ | 119/483 |
| 7,481,183 B2 * | 1/2009 | Van Heygen | .................. | 119/246 |
| 2002/0152969 A1 * | 10/2002 | Grigsby et al. | ................ | 119/500 |
| 2004/0211368 A1 * | 10/2004 | Chen | ............................... | 119/455 |
| 2005/0056232 A1 * | 3/2005 | O'Niell | .......................... | 119/500 |
| 2005/0120968 A1 * | 6/2005 | Dorsey | ........................... | 119/165 |
| 2005/0241593 A1 * | 11/2005 | Kaura | ............................ | 119/496 |
| 2005/0284405 A1 * | 12/2005 | Pomakoy-Poole et al. | ... | 119/497 |
| 2006/0112897 A1 * | 6/2006 | Moore | ............................ | 119/482 |
| 2006/0249093 A1 * | 11/2006 | Fuksa et al. | .................... | 119/482 |
| 2008/0011239 A1 * | 1/2008 | Byers | ............................. | 119/500 |
| 2008/0022942 A1 * | 1/2008 | Chu | ................................ | 119/500 |
| 2008/0060586 A1 * | 3/2008 | Lewis et al. | .................... | 119/500 |
| 2009/0031964 A1 * | 2/2009 | Proxmire | ....................... | 119/484 |
| 2011/0005466 A1 * | 1/2011 | Furth | ............................. | 119/496 |

\* cited by examiner

*Primary Examiner* — Rob Swiatek
*Assistant Examiner* — Ebony Evans

(57) ABSTRACT

A combined climate-controlled kennel supporting enclosure and carrying kennel for providing a safe and comfortable environment for an animal during transport procedures may include a carrying kennel to safeguard an animal therein and a supporting enclosure. The enclosure may include a body and cavity centrally formed therein. The body further may include a base member to maintain the carrying kennel elevated above a ground surface. A plurality of storage compartments may be housed within an uppermost region of the cavity. Each storage compartment may be independently toggled between open and closed positions while the carrying kennel remains statically nested within the cavity. Further, a mechanism may be included for automatically regulating a real-time internal air temperature level within the cavity. The mechanism may operate such that the real-time internal air temperature level may be constantly maintained within a predetermined and safe temperature range during transport procedures.

14 Claims, 5 Drawing Sheets

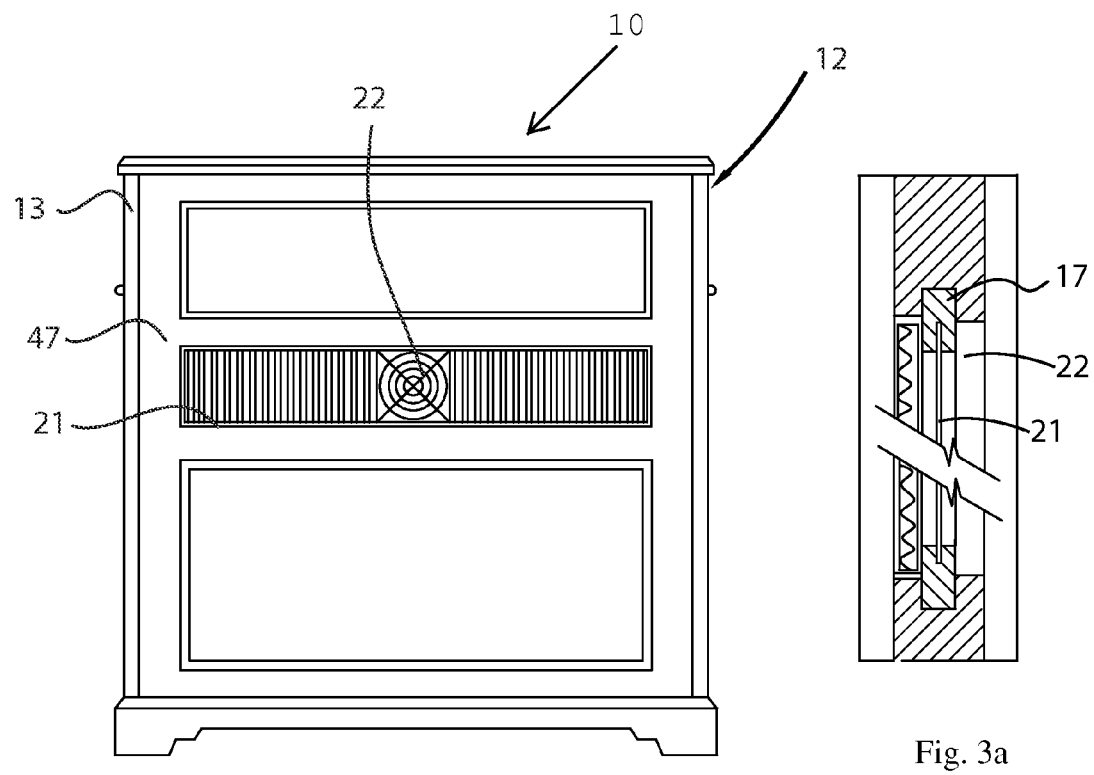
Fig. 3
Fig. 3a
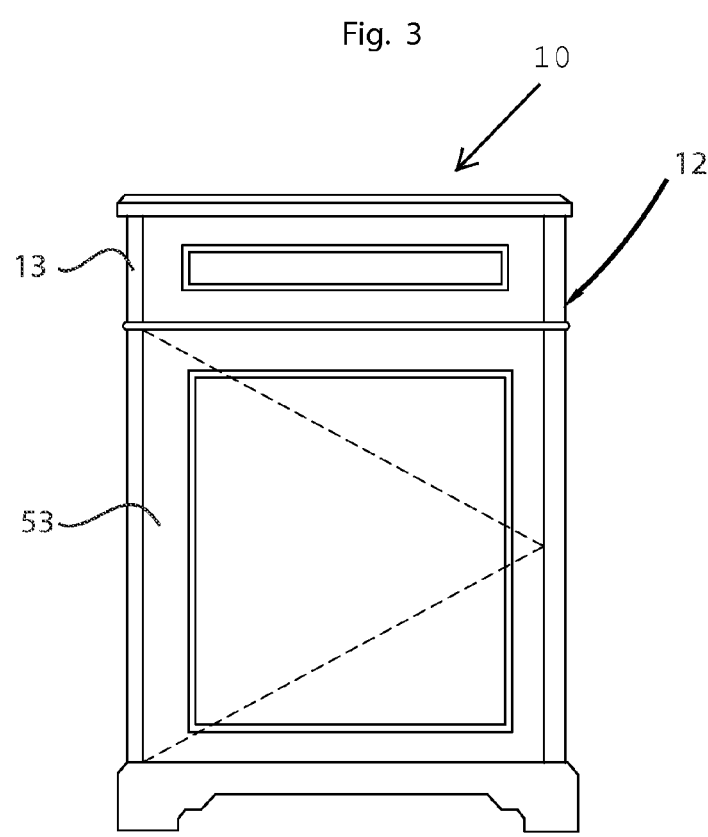
Fig. 4

COMBINED CLIMATE-CONTROLLED KENNEL SUPPORTING ENCLOSURE AND CARRYING KENNEL AND ASSOCIATED METHOD

CROSS REFERENCE TO RELATED APPLICATIONS

This application claims the benefit of U.S. Provisional Application No. 61/065,639, filed Feb. 14, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION
TECHNICAL FIELD

This invention relates to animal transporting enclosures and, more particularly, to a combined climate-controlled kennel supporting enclosure and carrying kennel for providing a safe and comfortable environment for an animal during extended transport procedures.

PRIOR ART

Because pets are often deemed members of the family, people will take their animals wherever they travel. For times as simple as making a quick trip to the grocery store or gas station, the family dog or cat will often ride along in the back seat or even on the driver's lap. When the travel becomes more lengthy, such as vacations across the state or country, problems may arise when determining the best and most comfortable way for the animal to travel when trapped inside the small spaces of cars and airplanes. These problems may be even more of an issue during the hottest months of the summer, a time when more people take vacations and often travel long distances to do so. From May through October, major problems may occur in many parts of the country when the sun raises the temperature within vehicle to extreme levels. Unfortunately, many dogs and cats have died when left in overheated vehicles for extended periods of time. Thus, precautions must be taken to ensure the safety of the much loved animal members of the family.

U.S. Pat. No. 5,887,436 to Duddleston discloses a cooled pet carrier for housing therein a pet and a cooling system. The cooling system comprises a Peltier module having a Peltier effect and a cooling system housing having a slidable lid member wherein the slidable lid member serves to re-circulate cooled air from the interior of the housing to the Peltier module when the slidable lid member is in a first position and serves to allow stale air to vent from the interior of the housing and be replenished with fresh air when the slidable lid member is in a second position.

U.S. Pat. No. 6,490,995 to Greene discloses an apparatus for transporting animals in an air-conditioned environment. The apparatus uses crushed ice to air-condition an insulator animal container at approximately 74 degrees Fahrenheit in ambient temperatures up to 120 degrees Fahrenheit for 12 hours on one twenty pound charge of ice. The preferred embodiment is self-contained providing storage for the animal, ice, and electric power for a ventilation fan plus food and water. The device operates on 12 volts DC and may serve to transport animals in enclosed motor vehicles and common carriers including airline. An intrinsically safety backup system will keep the animal cool, provided ice is present, upon failure of the ventilation fan.

U.S. Pat. No. 5,727,503 to Whittaker discloses a new Portable Cooling Kennel System for maintaining the temperature within a pet's kennel below a desired level and thereby allowing the pet to travel with the owner on long trips, more particularly on airplane flights. The inventive device includes a typical kennel structure comprising a ventilation system, a sliding ice tray slidably projecting within the lower portion of the kennel structure, and at least one ice cartridge storage body for storing ice for cooling of the present invention.

Accordingly, a need remains for a combined climate-controlled kennel supporting enclosure and carrying kennel in order to overcome the above-noted shortcomings. The present invention satisfies such a need by providing a device that is convenient and easy to use, is durable yet lightweight in design, is versatile in its applications, and provides a safe and comfortable environment for an animal during extended transport procedures.

BRIEF SUMMARY OF THE INVENTION

In view of the foregoing background, it is therefore an object of the present invention to provide an apparatus for providing a safe and comfortable environment for an animal during extended transport procedures. These and other objects, features, and advantages of the invention are provided by a combined climate-controlled kennel supporting enclosure and carrying kennel.

A combined climate-controlled kennel supporting enclosure and carrying kennel for providing a safe and comfortable environment for an animal during extended transport procedures may include a carrying kennel adapted to receive and safeguard an animal therein. In addition, the present invention may include a kennel supporting enclosure preferably including a hollow body provided with a cavity centrally formed therein. Such a cavity may be suitably sized and shaped such that the carrying kennel may be removably seated within the cavity during extended transport procedures.

The body further may include a base member attached to an open bottom end of the cavity to thereby maintain the carrying kennel elevated above a ground surface. Additionally, the body may include a plurality of storage compartments housed within an uppermost region of the cavity. Each of such storage compartments may be independently toggled between open and closed positions while the carrying kennel remains statically nested within a lowermost region of the cavity.

The combined climate-controlled kennel supporting enclosure and carrying kennel may additionally include the carrying kennel having at least one grill attached thereto so that the carrying kennel and the cavity may be in fluid communication with each other. Further, a plurality of casters may be mated to an underside of the base member for assisting a caregiver to transport the body along a ground surface.

Further, the combined carrying kennel and supporting enclosure may include a mechanism for automatically regulating a real-time internal air temperature level within the cavity. The mechanism may operate such that the real-time internal air temperature level may be constantly maintained within a predetermined and safe temperature range during extended transport procedures.

The automatic internal air temperature level regulating mechanism may additionally include a first grill positioned at a first wall of the body for permitting ambient air to freely ingress and egress the cavity. Further, the mechanism may include a power-actuated rotary fan mounted to the first grill. A user interface may be included and communicatively coupled to the rotary fan. Such a user interface may generate and transmit an input signal to the rotary fan upon receiving a user input. Also, a power source may be included and communicatively coupled to the rotary fan in such a manner that the rotary fan may be automatically toggled between operating and non-operating modes upon receiving a corresponding one of the input signals.

The automatic internal air temperature level regulating mechanism further may include an air filter positioned adjacent to the rotary fan and located upstream thereof. In this manner, undesirable foreign debris may be prohibited from passing downstream and through the rotary fan. Additionally, the air filter may be impregnated with a deodorizing agent for providing a pleasurable scent as the ambient air ingresses the cavity and the carrying kennel respectively.

The automatic internal air temperature level regulating mechanism further may include a first sensor positioned inside the cavity and further positioned adjacent to the carrying kennel. The first sensor may detect the real-time internal air temperature level inside the cavity. Additionally, a second sensor may be included and positioned exterior of the cavity and further positioned adjacent to the rotary fan. The second sensor may detect a real-time external air temperature level outside the cavity.

In operation, each of the first and second sensors may generate a true input signal when the real-time internal and external air temperature levels are within the predetermined and safe temperature range respectively. Further, each of the first and second sensors may generate a false input signal when the real-time internal and external air temperature levels are outside the predetermined and safe temperature range respectively.

The automatic internal air temperature level regulating mechanism further may include a logic gate electrically coupled directly to the first and second sensors respectively. Also, a toggle switch may be included and electrically coupled directly to the logic gate, the power source, and the rotary fan respectively. During operating procedures, the logic gate may receive each of the input signals from the first and second sensors respectively and thereafter generate and transmit a corresponding output signal to the toggle switch. The output signal may be false when either of the input signals is false, and the output signal may be true when both of the input signals are true.

Further, the toggle switch may be automatically toggled between closed and open positions when the output signal is true and false respectively for permitting and prohibiting power from reaching the rotary fan. In this manner, the rotary fan may be automatically toggled between operating and non-operating modes when the toggle switch is adapted to the closed and open positions respectively, and may thereby cause the ambient air to circulate within the cavity.

The present invention may further include a method for providing a safe and comfortable environment for an animal during extended transport procedures. Such a method may include the chronological steps of first providing a carrying kennel adapted to receive and safeguard an animal therein. Next, the method may include a step of providing a kennel supporting enclosure including a hollow body provided with a cavity centrally formed therein.

A third step may entail removably seating the carrying kennel within the cavity during extended transport procedures. The body may further include a base member attached to an open bottom end of the cavity, thereby maintaining the carrying kennel elevated above a ground surface. Also, the body may include a plurality of storage compartments housed within an uppermost region of the cavity. Each of the storage compartments may be independently toggled between open and closed positions while the carrying kennel remains statically nested within a lowermost region of the cavity.

A final step of the method may include automatically regulating a real-time internal air temperature level within the cavity such that the real-time internal air temperature level may be constantly maintained within a predetermined and safe temperature range during extended transport procedures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a left-side elevational view of the apparatus shown in FIG. 1;

FIG. 3a is a partial cross-sectional view of the first grill shown in FIG. 3;

FIG. 4 is a rear elevational view of the apparatus shown in FIG. 1;

Figure 1:
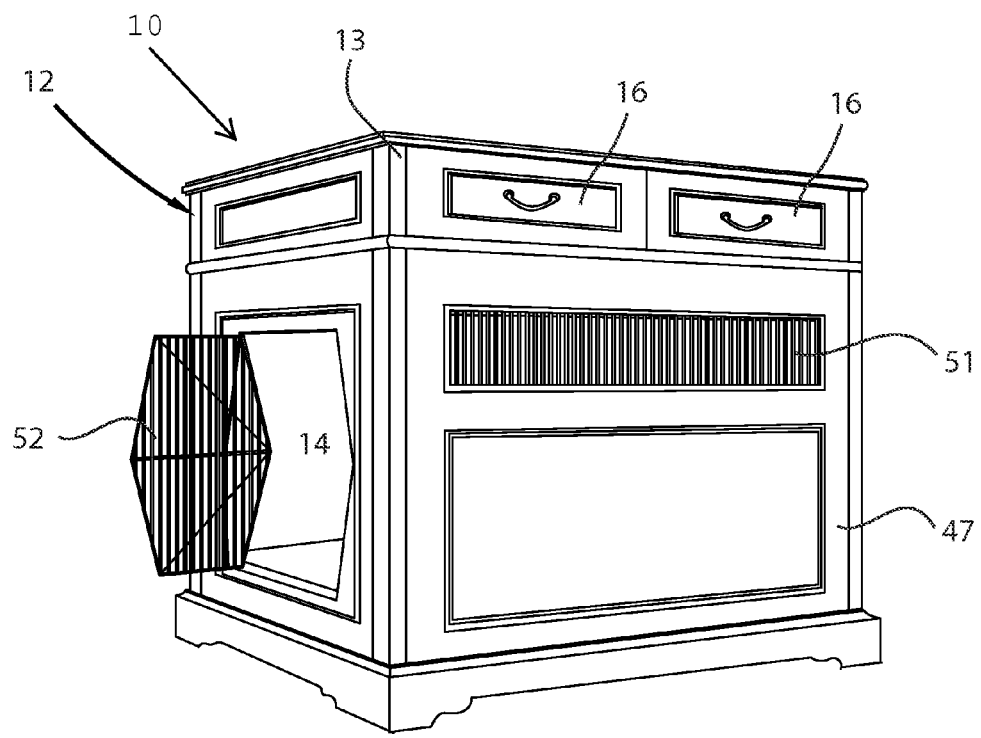
FIG. 1 is a perspective view showing a combined climate-controlled kennel supporting enclosure and carrying kennel, in accordance with the present invention.
Figures 2, 2A:
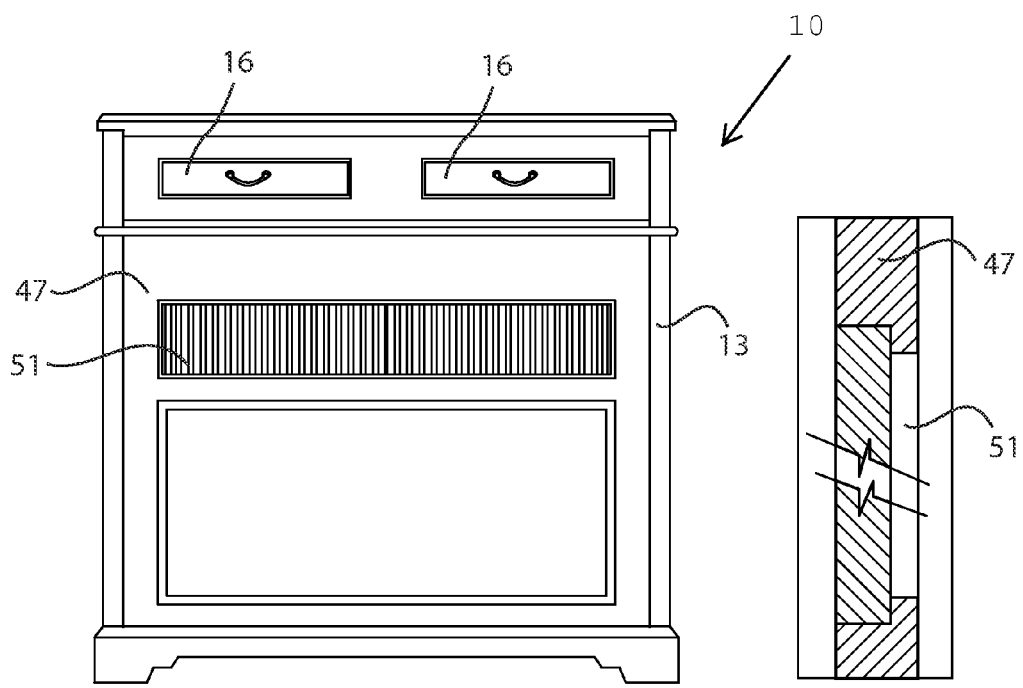
FIG. 2 is a right side elevational view of the apparatus shown in FIG. 1.
FIG. 2a is a partial cross-sectional view of the second grill shown in FIG. 2.
Figure 5:
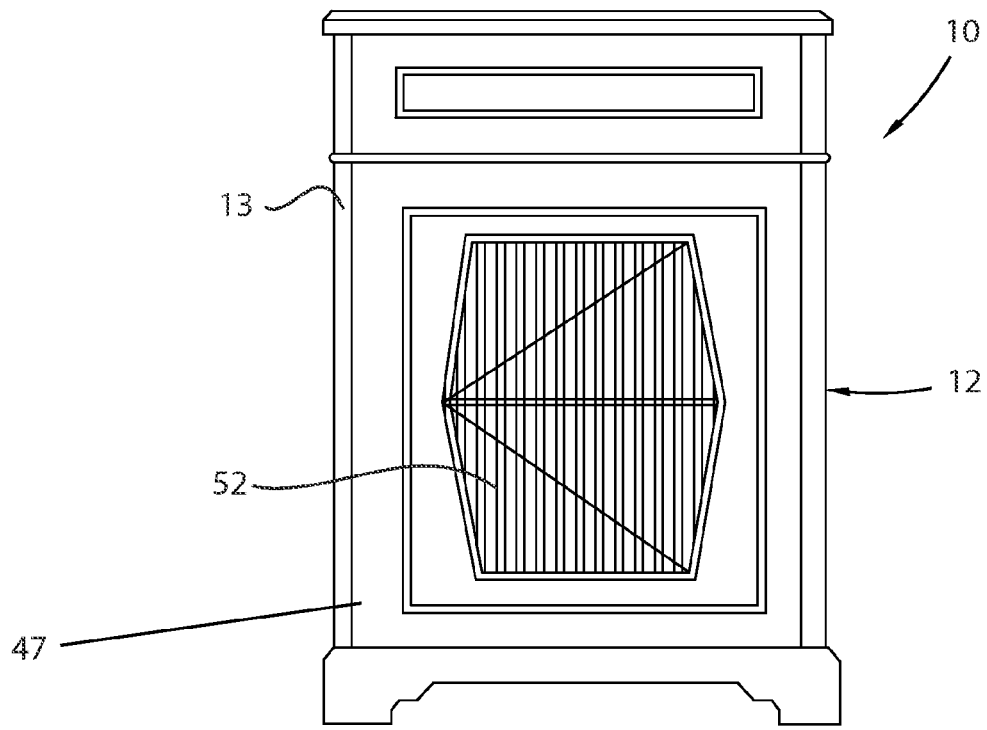
FIG. 5 is a front elevational view of the apparatus shown in FIG. 1.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-9 by the reference numeral 10 and is intended to provide a combined climate-controlled kennel supporting enclosure 12 and carrying kennel 13. It should be understood that the combined climate-controlled kennel supporting enclosure 12 and carrying kennel 13 may be used to provide a safe and comfortable environment for many different types of animal, including dogs, cats, birds, and a variety of other domesticated animals during extended transport procedures, whether by airplane, train, or passenger vehicle. The present invention should not be limited to the applications disclosed herein.

A combined climate-controlled kennel supporting enclosure 12 and carrying kennel 13 for providing a safe and comfortable environment for an animal during extended transport procedures may include a carrying kennel 13 adapted to receive and safeguard an animal therein. The carrying kennel 13 may have at least one grill attached thereto so that the carrying kennel 13 and the cavity 14 may be in fluid communication with each other and thereby provide unrestricted air-flow to the animal housed inside kennel 13.

In addition, the present invention 10 may include a kennel supporting enclosure 12 preferably including a hollow body 13 provided with a cavity 14 centrally formed therein. Such a cavity 14 may be suitably sized and shaped such that the carrying kennel 11 may be removably seated within the cavity 14 during extended transport procedures. First and second access panels 52, 53 are pivotally coupled to body 13 for permitting the caregiver to quickly access kennel 11 within cavity 14. The body 13 further may include a base member 15 attached to an open bottom end of the cavity 14 to thereby maintain the carrying kennel 11 elevated above a ground surface.

Additionally, the body 13 may include a plurality of storage compartments 16 housed within an uppermost region of the cavity 14. Each of such storage compartments 16 may be independently toggled between open and closed positions while the carrying kennel 11 remains statically nested within a lowermost region of the cavity 14. Further, a plurality of casters 27 may be mated to an underside of the base member 15 for assisting a caregiver to transport the body 13 along a ground surface.

Figure 6:
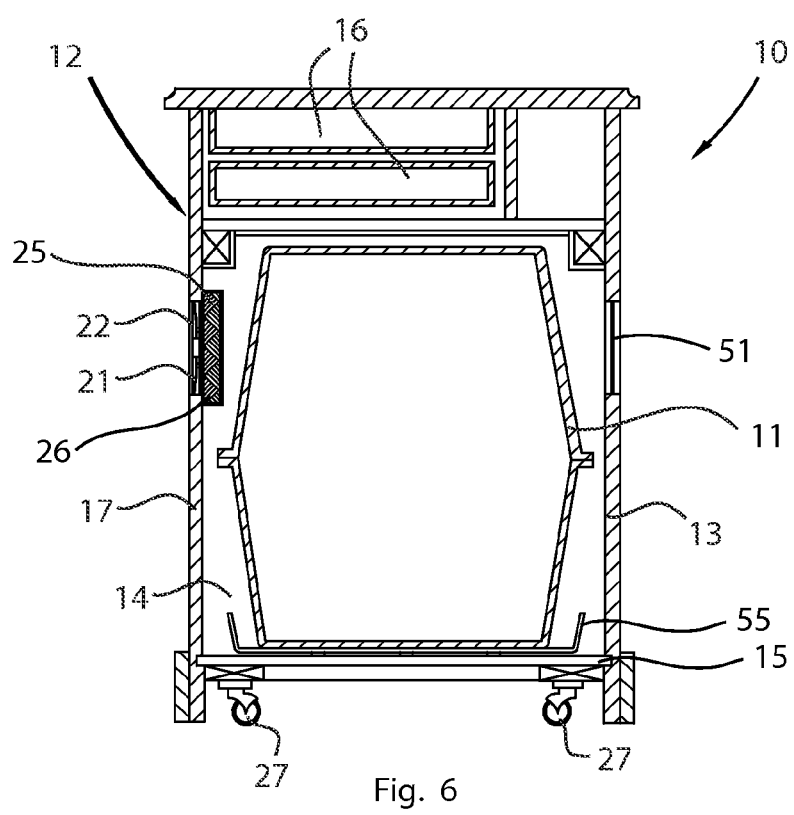
FIG. 6 is a cross-sectional view of the present invention showing the structural relationship between major mechanical components of the present invention.
Figure 7:
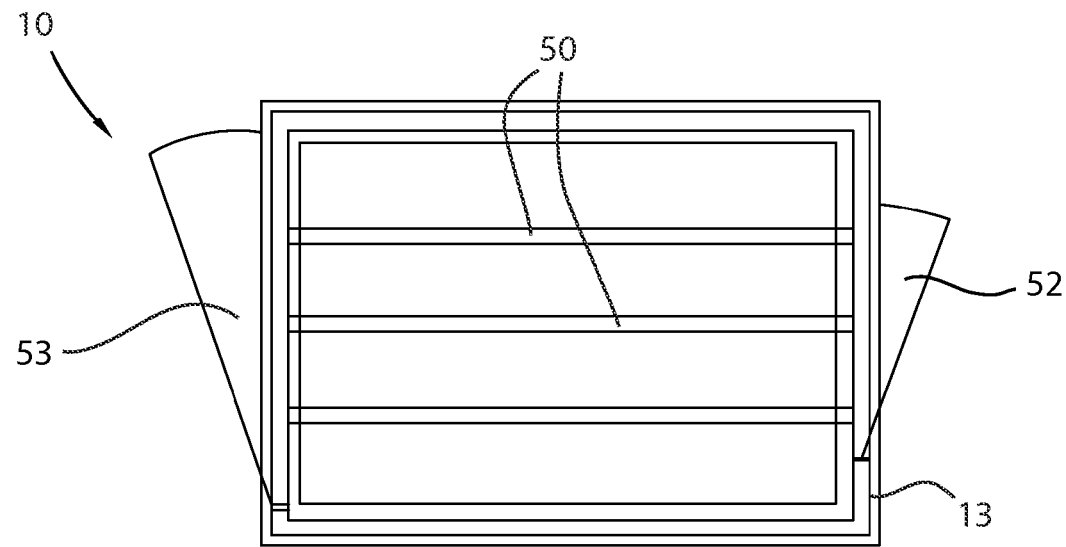
FIG. 7 a top plan view of the body without the top surface and storage compartments, showing the guide tracks.
Figure 8:
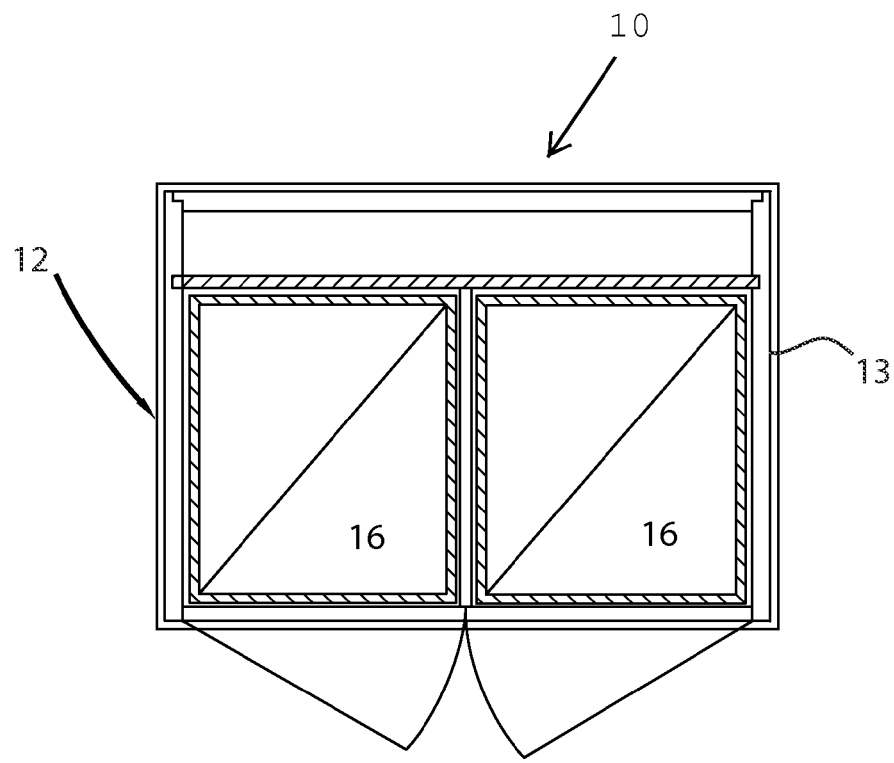
FIG. 8 a top plan view of the body without the top surface, showing the storage compartments.

As perhaps best shown in FIGS. 6 and 7, a support tray 55 may be positioned on base member 15 for receiving and holding kennel 11 at a substantially stable position. A plurality of glide tracks 50 may also be formed on the base member 15 for assisting the caregiver to effortlessly sliding the kennel 11 into and out from cavity 14.

Figure 9:
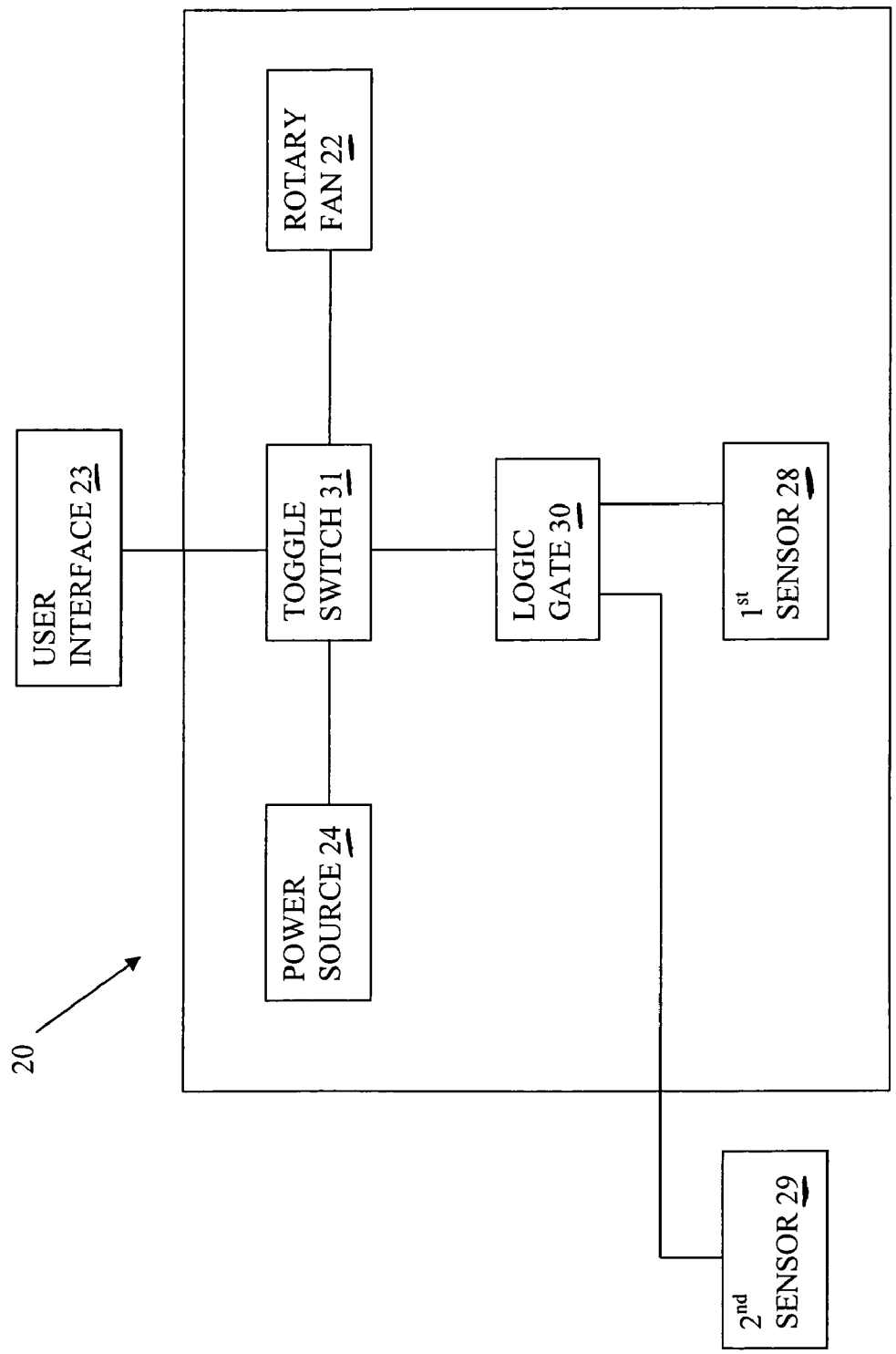
FIG. 9 is a schematic block diagram showing the interrelationship between the major electronic components of the automatic internal air temperature level regulating mechanism, in accordance with the present invention.

Referring to FIGS. 6 and 9, the combined carrying kennel 11 and supporting enclosure 12 may include a mechanism 20 for automatically regulating a real-time internal air temperature level within the cavity 14. The mechanism 20 may operate such that the real-time internal air temperature level may be constantly maintained within a predetermined and safe temperature range during extended transport procedures. In this manner, the animal is maintained in a safe and comfortable environment and thereby reducing the likelihood of undesirable asphyxiation due to hot or humid weather conditions.

The automatic internal air temperature level regulating mechanism 20 may additionally include a first grill 21 positioned at a first wall 17 of the body 13 for permitting ambient air to freely ingress and egress the cavity 14. A second grill 51 may be positioned on a second wall 47 for further promoting air-circulation within the cavity 14 and kennel 11. Further, the mechanism 20 may include a power-actuated rotary fan 22 mounted to the first grill 21. A user interface 23 may be included and communicatively coupled to the rotary fan 22. Such a user interface 23 may generate and transmit an input signal to the rotary fan 22 upon receiving a user input. For example, user interface 23 may include a remote control that allows the user to remotely control an operating mode of rotary fan 22.

The user interface 23 may include a variety of stand-alone or shared devices that are capable of generating and transmitting a control signal upon receiving a user input. For example, exemplary user interface devices may include a remote controller employing RF, infra-red, acoustic or cellular technology, as well known in the industry. In alternate embodiments, the user interface may include a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present invention. Of course, the user interfaces may include other components, peripherals and software applications provided they are compatible and capable of cooperating with remaining devices of the present invention. In addition, the user interfaces may include information, documents, data and files needed to provide functionality and enable performance of methodologies in accordance with an exemplary embodiment of the invention.

Also, a power source 24 may be included and communicatively coupled to the rotary fan 22 in such a manner that the rotary fan 22 may be automatically toggled between operating and non-operating modes upon receiving a corresponding one of the input signals. The power source 24 may include one or more rechargeable or non-rechargeable disposable batteries, photovoltaic cells, and/or an AC adapter or other power supply means.

The automatic internal air temperature level regulating mechanism 20 further may include an air filter 26 positioned adjacent to the rotary fan 22 and located upstream thereof. In this manner, undesirable foreign debris may be prohibited from passing downstream and through the rotary fan 22. Optionally, the air filter 26 may be impregnated with a deodorizing agent for providing a pleasurable scent as the ambient air ingresses the cavity 14 and the carrying kennel 13 respectively. Of course, one skilled in the art understands that various types of air-filtration and air-purification systems may be employed, without departing from the true spirit and scope of the present invention.

Referring to FIGS. 6 and 9, the automatic internal air temperature level regulating mechanism 20 further may include a first sensor 28 positioned inside the cavity 14 and further positioned adjacent to the carrying kennel 13. The first sensor 28 may detect the real-time internal air temperature level inside the cavity 14. Additionally, a second sensor 29 may be included and positioned exterior of the cavity 14 and further positioned adjacent to the rotary fan 22. The second sensor 29 may detect a real-time external air temperature level outside the cavity 14.

Active and/or passive sensors may be used to react to detectable subject matter such as light, noise, radiation (e.g., heat), or changes in emitted energy, fields or beams. However, the invention is not limited to a particular type of sensor. Those skilled in the art will appreciate that other sensors may be used without departing from the scope of the invention. Examples of such other sensors include pressure sensitive mats; optical sensors configured to sense light; microwave sensors that use a Gunn diode operating within pre-set limits to transmit/flood a designated area/zone with an electronic field whereby changes in temperature and humidity levels in the zone disturbs the field and sets off an alarm; or any other sensor capable of providing temperature detection capability in accordance with principles of the invention.

In operation, each of the first and second sensors 28, 29 may generate a true input signal when the real-time internal and external air temperature levels are within the predetermined and safe temperature range respectively. Further, each of the first and second sensors 28, 29 may generate a false input signal when the real-time internal and external air temperature levels are outside the predetermined and safe temperature range respectively. For example, the sensors 28, 29 may be preprogrammed to generate the true signals when the real-tie air temperature levels are high due to inclement weather conditions to thereby activate the rotary fan 22. In cases where the real-time air temperature levels are low due to inclement weather conditions, the present invention may further employ a heating element located downstream of the rotary fan 22 for warming-up the air flow traveling towards kennel 11.

The automatic internal air temperature level regulating mechanism further may include a logic gate 30 electrically coupled directly to the first and second sensors 29 respectively. Also, a toggle switch 31 may be included and electrically coupled directly to the logic gate 30, the power source 24, and the rotary fan 22 respectively. During operating procedures, the logic gate 30 may receive each of the input signals from the first and second sensors 29 respectively and thereafter generate and transmit a corresponding output signal to the toggle switch 31. The output signal may be false when either of the input signals is false, and the output signal may be true when both of the input signals are true.

Further, the toggle switch 31 may be automatically toggled between closed and open positions when the output signal is true and false respectively for permitting and prohibiting power from reaching the rotary fan 22. In this manner, the rotary fan 22 may be automatically toggled between operating and non-operating modes when the toggle switch 31 is adapted to the closed and open positions respectively, and may thereby cause the ambient air to circulate within the cavity 14. In this manner, the caregiver will have peace of mind knowing the quality and temperature of the air inside the kennel 11 is safe.

The present invention may further include a method for providing a safe and comfortable environment for an animal during extended transport procedures. Such a method may include the chronological steps of first providing a carrying kennel 13 adapted to receive and safeguard an animal therein. Next, the method may include a step of providing a kennel supporting enclosure 12 including a hollow body 13 provided with a cavity 14 centrally formed therein.

A third step may entail removably seating the carrying kennel 13 within the cavity 14 during extended transport procedures. The body 13 may further include a base member 15 attached to an open bottom end of the cavity 14, thereby maintaining the carrying kennel 13 elevated above a ground surface. Also, the body 13 may include a plurality of storage compartments 16 housed within an uppermost region of the cavity 14. Each of the storage compartments 16 may be independently toggled between open and closed positions while the carrying kennel 13 remains statically nested within a lowermost region of the cavity 14.

A final step of the method may include automatically regulating a real-time internal air temperature level within the cavity 14 such that the real-time internal air temperature level may be constantly maintained within a predetermined and safe temperature range during extended transport procedures.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined climate-controlled kennel supporting enclosure and carrying kennel for providing a safe and comfortable environment for an animal during extended transport procedures, said combined climate-controlled kennel supporting enclosure and carrying kennel comprising:

a carrying kennel adapted to receive and safeguard an animal therein;

a kennel supporting enclosure including a hollow body provided with a cavity centrally formed therein, said cavity being suitably sized and shaped such that said carrying kennel is removably seated within said cavity during extended transport procedures, said body further including a base member attached to an open bottom end of said cavity and thereby maintaining said carrying kennel elevated above a ground surface, said body further comprising a plurality of storage compartments housed within an uppermost region of said cavity; and means for automatically regulating a real-time internal air temperature level within said cavity such that said real-time internal air temperature level is constantly maintained within a predetermined and safe temperature range during extended transport procedures;

wherein said automatic internal air temperature level regulating means further comprises a first grill positioned at a first wall of said body for permitting ambient air to freely ingress and egress said cavity;

a power-actuated rotary fan mounted to said first grill;

a user interface communicatively coupled to said rotary fan, said user interface generating and transmitting an input signal to said rotary fan upon receiving a user input; and a power source communicatively coupled to said rotary fan in such a manner that said rotary fan is automatically toggled between operating and non-operating modes upon receiving a corresponding one of said input signal;

wherein said automatic internal air temperature level regulating means comprises:

a first sensor positioned inside said cavity and further being positioned adjacent to said carrying kennel, said first sensor detecting said real-time internal air temperature level inside said cavity;

a second sensor positioned exterior of said cavity and further being positioned adjacent to said rotary fan, said second sensor detecting a real-time external air temperature level outside said cavity;

wherein each of said first and second sensors generates a true input signal when said real-time internal and external air temperature levels are within said predetermined and safe temperature range respectively;

wherein each of said first and second sensors generates a false input signal when said real-time internal and external air temperature levels are outside said predetermined and safe temperature range respectively.

2. The combined climate-controlled kennel supporting enclosure and carrying kennel of claim 1, wherein said automatic internal air temperature level regulating means further comprises:

an air filter positioned adjacent to said rotary fan and located upstream thereof such that undesirable foreign debris is prohibited from passing downstream and through said rotary fan.

3. The combined climate-controlled kennel supporting enclosure and carrying kennel of claim 2, wherein said air filter is impregnated with a deodorizing agent for providing a pleasurable scent as the ambient air ingresses said cavity and said carrying kennel respectively.

4. The combined climate-controlled kennel supporting enclosure and carrying kennel of claim 1, wherein said carrying kennel has at least one grill attached thereto so that said carrying kennel and said cavity are in fluid communication with each other.

5. The combined climate-controlled kennel supporting enclosure and carrying kennel of claim 1, further comprising: a plurality of casters mated to an underside of said base member for assisting a caregiver to transport said body along a ground surface.

6. The combined climate-controlled kennel supporting enclosure and carrying kennel of claim 1, wherein said automatic internal air temperature level regulating means further comprises:

a logic gate electrically coupled directly to said first and second sensors respectively; and a toggle switch electrically coupled directly to said logic gate, said power source and said rotary fan respectively;

wherein said logic gate receives each of said input signals from said first and second sensors respectively and thereafter generates and transmits a corresponding output signal to said toggle switch;

wherein said output signal is false when either of said input signals is false;

wherein said output signal is true when both of said input signals are true;

wherein said toggle switch is automatically toggled between closed and open positions when said output signal is true and false respectively for permitting and prohibiting power from reaching said rotary fan.

7. The combined climate-controlled kennel supporting enclosure and carrying kennel of claim 6, wherein said rotary fan is automatically toggled between operating and non-operating modes when said toggle switch is adapted to said closed and open positions respectively and thereby causes the ambient air to circulate within said cavity.

8. A combined climate-controlled kennel supporting enclosure and carrying kennel for providing a safe and comfortable environment for an animal during extended transport procedures, said combined climate-controlled kennel supporting enclosure and carrying kennel comprising:

a carrying kennel adapted to receive and safeguard an animal therein;

a kennel supporting enclosure including a hollow body provided with a cavity centrally formed therein, said cavity being suitably sized and shaped such that said carrying kennel is removably seated within said cavity during extended transport procedures, said body further including a base member attached to an open bottom end of said cavity and thereby maintaining said carrying kennel elevated above a ground surface, said body further comprising a plurality of storage compartments housed within an uppermost region of said cavity, each of said storage compartments being independently toggled between open and closed positions while said carrying kennel remains statically nested within a lowermost region of said cavity; and means for automatically regulating a real-time internal air temperature level within said cavity such that said real-time internal air temperature level is constantly maintained within a predetermined and safe temperature range during extended transport procedures;

wherein said automatic internal air temperature level regulating means further comprises a first grill positioned at a first wall of said body for permitting ambient air to freely ingress and egress said cavity;

a power-actuated rotary fan mounted to said first grill;

a user interface communicatively coupled to said rotary fan, said user interface generating and transmitting an input signal to said rotary fan upon receiving a user input; and a power source communicatively coupled to said rotary fan in such a manner that said rotary fan is automatically toggled between operating and non-operating modes upon receiving a corresponding one of said input signal;

wherein said automatic internal air temperature level regulating means comprises:

a first sensor positioned inside said cavity and further being positioned adjacent to said carrying kennel, said first sensor detecting said real-time internal air temperature level inside said cavity;

a second sensor positioned exterior of said cavity and further being positioned adjacent to said rotary fan, said second sensor detecting a real-time external air temperature level outside said cavity;

wherein each of said first and second sensors generates a true input signal when said real-time internal and external air temperature levels are within said predetermined and safe temperature range respectively;

wherein each of said first and second sensors generates a false input signal when said real-time internal and external air temperature levels are outside said predetermined and safe temperature range respectively.

9. The combined climate-controlled kennel supporting enclosure and carrying kennel of claim 8, wherein said automatic internal air temperature level regulating means further comprises:

an air filter positioned adjacent to said rotary fan and located upstream thereof such that undesirable foreign debris is prohibited from passing downstream and through said rotary fan.

10. The combined climate-controlled kennel supporting enclosure and carrying kennel of claim 9, wherein said air filter is impregnated with a deodorizing agent for providing a pleasurable scent as the ambient air ingresses said cavity and said carrying kennel respectively.

11. The combined climate-controlled kennel supporting enclosure and carrying kennel of claim 8, wherein said carrying kennel has at least one grill attached thereto so that said carrying kennel and said cavity are in fluid communication with each other.

12. The combined climate-controlled kennel supporting enclosure and carrying kennel of claim 8, further comprising: a plurality of casters mated to an underside of said base member for assisting a caregiver to transport said body along a ground surface.

13. The combined climate-controlled kennel supporting enclosure and carrying kennel of claim 8, wherein said automatic internal air temperature level regulating means further comprises:

a logic gate electrically coupled directly to said first and second sensors respectively; and
a toggle switch electrically coupled directly to said logic gate, said power source and said rotary fan respectively;
wherein said logic gate receives each of said input signals from said first and second sensors respectively and thereafter generates and transmits a corresponding output signal to said toggle switch;
wherein said output signal is false when either of said input signals is false;
wherein said output signal is true when both of said input signals are true;
wherein said toggle switch is automatically toggled between closed and open positions when said output signal is true and false respectively for permitting and prohibiting power from reaching said rotary fan.

14. The combined climate-controlled kennel supporting enclosure and carrying kennel of claim 13, wherein said rotary fan is automatically toggled between operating and non-operating modes when said toggle switch is adapted to said closed and open positions respectively and thereby causes the ambient air to circulate within said cavity.

* * * * *